I. H. WILLIAMS.
ANIMAL POKE.
APPLICATION FILED JULY 15, 1913.
1,091,414.
Patented Mar. 24, 1914.
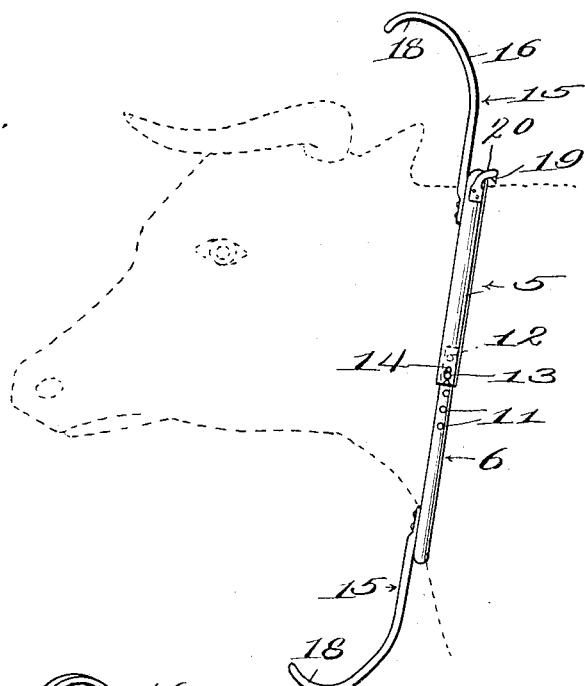
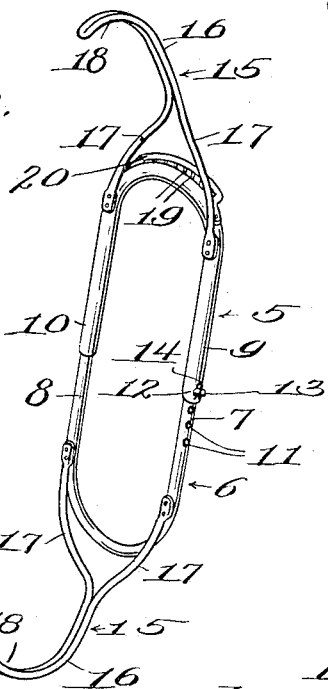
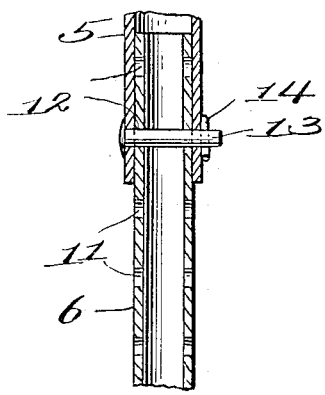
Witnesses
C. E. Kesler
Chas. S. Hyer
Inventor
Ira H. Williams
by
James L. Norris,
Attorney

UNITED STATES PATENT OFFICE.

IRA H. WILLIAMS, OF MAPLE CREEK, SASKATCHEWAN, CANADA, ASSIGNOR OF ONE-HALF TO CLARENCE B. WILLIAMS, OF PENCE, CANADA.

ANIMAL-POKE.

1,091,414.  Specification of Letters Patent.  Patented Mar. 24, 1914.

Application filed July 15, 1913. Serial No. 779,214.

*To all whom it may concern:*

Be it known that I, IRA H. WILLIAMS, a subject of the King of Great Britain, residing at Maple Creek, in the Province of Saskatchewan, Dominion of Canada, have invented certain new and useful Improvements in Animal-Pokes, of which the following is a specification.

This invention relates to animal pokes, and the primary object of the same is to provide a simple device of this character having a particular structure and comprising telescopic sections which may be readily associated and separated and requiring but a single fastening means to positively connect the sections, the latter being equipped with a novel form of guards and with a spur or toothed member.

The invention consists in the construction and arrangement of the several parts which will be more fully hereinafter described and claimed.

In the drawing: Figure 1 is a side elevation of a poke embodying the features of the invention and shown applied. Fig. 2 is a perspective view of the same. Fig. 3 is a longitudinal section on an enlarged scale through a portion of the poke.

The numerals 5 and 6 designate the two sections of the poke, said sections being composed of suitable lengths of pipe bent or otherwise formed in the shape shown or to produce bows, the diameter of the pipe of the lower section 6 being less than the pipe of the upper section 5 to permit the ends 7 and 8 of the said section 6 to adjustably telescope in the ends 9 and 10 of the section 5. The end 7 of section 6 has a plurality of openings 11 drilled therethrough, and the end 9 of section 5 has a single opening 12 formed therein and adapted to register with either of the openings 11. A single fastening or round headed bolt 13 is removably inserted through the openings 12 and 11 in registration and locked against accidental displacement by a spring or cotter pin 14.

Guards 15 are secured to and project from the sections 5 and 6, the guards both being similar in construction and each consisting of a metal rod doubled and having the members in close contact, as at 16, and also formed with divergent arms 17 secured to opposite portions of the sections 5 and 6 adjacent to the bends or arches of the latter. The guards project forwardly, and the doubled portions 16 are curved and terminate in hooks 18. The purpose of the guards is to engage fence boards, rails or wire strands and stop the animal from passing through an opening that may be found or formed in a fence, and when the guards come into engagement with wire strands, the latter move over said guards toward the hooks 18. These hooks catch and hold on the wire strands and have a tendency to draw the strands together and defeat the efforts of the animal to work through an opening that may be large enough to permit the head to pass. The pressure of the guards against resistances such as boards or wires of a fence forces the poke backwardly at an angle on the neck of the animal and brings a plurality of spurs or teeth 19, held by a support 20 secured on the bow of the upper section 5, in contact with the neck of the animal and causes the latter to desist in an effort to pass through an opening. The support 20 may be of any preferred form, but as shown consists of a rod suitably bent and secured at its ends to the bow of the section 5. The support 20 also preferably projects above and rearwardly at an angle from the bow of the section 5 and the spurs or teeth 19 also project at such angle as to positively engage the neck of the animal when pressed backwardly.

Among the main advantages of the improved poke are the formation of the sections 5 and 6 from pipe lengths of suitable diameter, the positive joints that ensue between the ends of the sections requiring only one fastening, and the facility in telescoping one section relatively to the other to adjust the poke to accommodate various sizes of animal necks. The strength and durability of the guards constructed as explained is also an important feature. The several parts may be varied in proportions and dimensions as well as in minor details of construction.

What is claimed is:

1. An animal poke comprising two sections formed of pipe, the ends of one section being telescopically fitted in the ends of the other section, and a single fastening means removably inserted through the one set of telescoped section ends, one of the sections being also provided with spur means.

2. An animal poke comprising two sections formed of pipe, the ends of one section being telescopically fitted in the ends of the other section, the one end of one section having a plurality of openings therethrough and the adjacent end of the other section having a single opening to register with any one of said plurality of openings, and a single fastening means removably inserted through the engaged ends of the sections having the openings therein.

3. An animal poke comprising two bowed sections formed of pipe and having their ends telescopically engaged, a single fastening means removably engaging the one set of telescoped section ends, and guards consisting of doubled metal rods with arms secured to the sections adjacent to the bows and having their doubled portions projected forwardly and bent to form hook terminals.

In testimony whereof I have hereunto set my hand in presence of two subscribing witnesses.

IRA H. WILLIAMS.

Witnesses:
    CHAS. S. HYER,
    JAMES L. NORRIS.

Copies of this patent may be obtained for five cents each, by addressing the "Commissioner of Patents, Washington, D. C."